Sept. 26, 1961  M. SKALKO  3,001,814
SAFETY BUMPER FOR VEHICLE DOOR
Filed Dec. 23, 1959
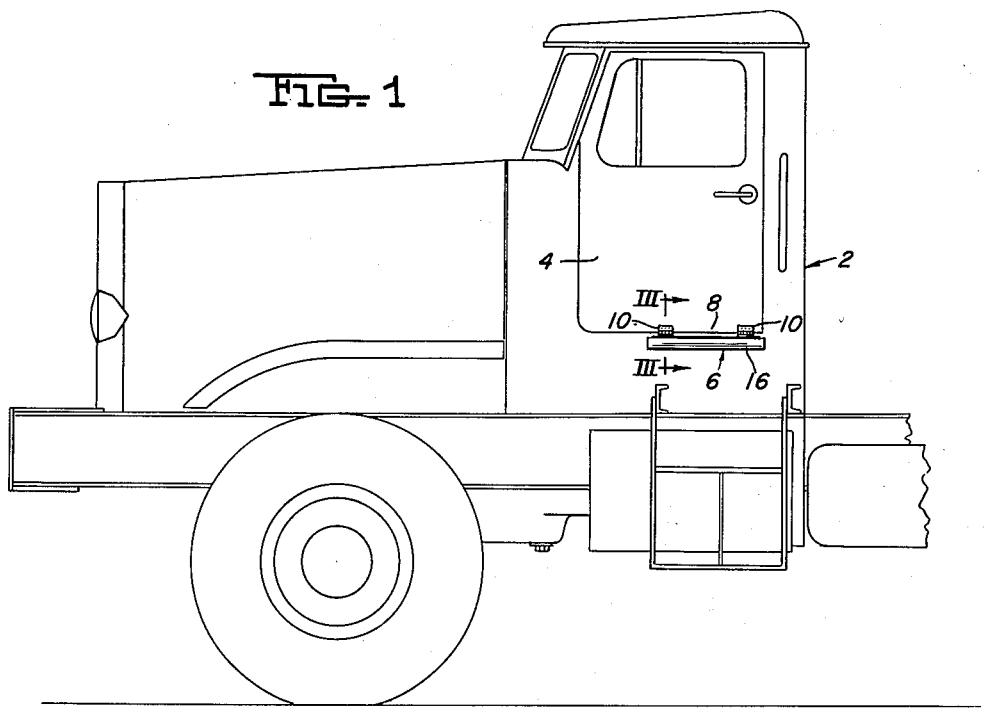
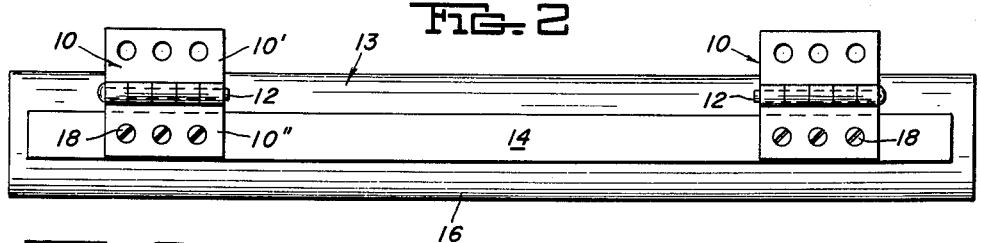
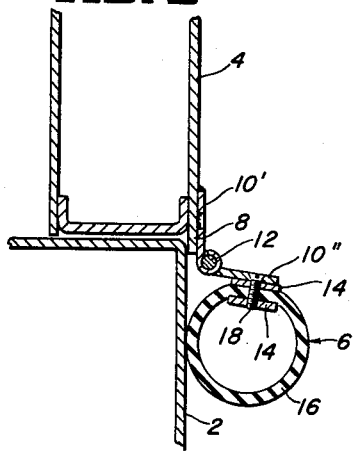
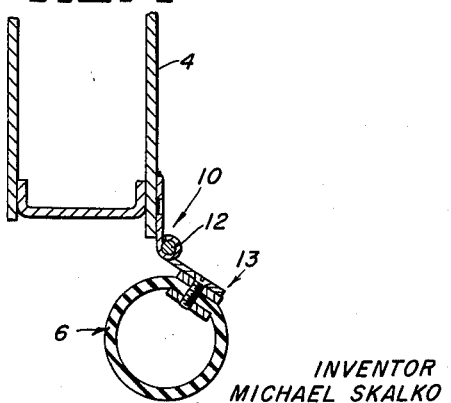
INVENTOR
MICHAEL SKALKO
By Donald G. Dalton
Attorney

United States Patent Office 3,001,814
Patented Sept. 26, 1961

1

3,001,814
SAFETY BUMPER FOR VEHICLE DOOR
Michael Skalko, Leoneth, Minn., assignor to United States Steel Corporation, a corporation of New Jersey
Filed Dec. 23, 1959, Ser. No. 861,697
2 Claims. (Cl. 296—44)

The present invention relates generally to motor vehicles and more particularly to a safety bumper for the bottom edge of a vehicle door.

It is the primary object of my invention to provide a resilient safety bumper or guard adapted to be easily affixed to the bottom edge of a motor vehicle door for preventing serious injuries to mechanics or others emerging from underneath the vehicle when the vehicle door is in open position.

This and other objects will become more apparent after referring to the following specification and attached drawings, in which:

FIGURE 1 is an elevational view showing the cab of a truck equipped with the device of the invention;

FIGURE 2 is an enlarged plan view showing the device of the invention;

FIGURE 3 is an enlarged cross-section view taken along the line III—III of FIGURE 1 showing the disposition of the safety bumper of the invention when the cab door is closed; and FIGURE 4 is a view similar to FIGURE 3 showing the safety bumper of the invention in operative position.

Referring more particularly to the drawings reference numeral 2 designates the cab portion of the body of a motor truck. The cab is provided with a conventional door 4 having the safty bumper of my invention, designated generally by reference numeral 6, installed along its bottom edge 8.

The safety bumper 6 includes a pair of leaf butt hinges 10 mounted in spaced relation on the outer surface of the bottom edge 8. One leaf 10' of each of the pair of hinges may be welded or otherwise rigidly mounted on the door surface in flatwise position with the pivot pin 12 of the hinge extending along the bottom edge of the door. The other leaf 10" of each hinge is free to pivot about the pin 12.

The resilient portion of the safety bumper of my invention includes an assembly 13 made up of a pair of rigid straps 14 and a length of flexible tubing 16. The assembly is arranged with one strap extending along the inside of the tubing 16 and the other extending along the outside of the tubing parallel with the strap on the inside as best shown in FIGURE 3. The entire assembly is mounted on the hinge leafs 10" by means of screws 18. As shown in FIGURES 2 and 3, screws 18 are threaded through hinge leafs 10", the outer strap 14, the wall of the tubing 16 and the inner strap 14.

In operation, when the door 4 is closed the tubing 16 engages the portion of the truck body adjacent the bottom of the door whereby the assembly 13 is held in upwardly pivoted position, as best shown in FIGURE 3.

When the door is opened, the tubing 16 is no longer supported by the truck body and the assembly 13 pivots downwardly by gravity so that the tubing 16 hangs below the door edge 8 in protecting position, as best shown in FIGURE 4.

While one embodiment of my invention has been shown and described, it will be apaprent that other adaptations and modifications may be made without departing from the scope of the following claims.

I claim:

1. In a door of a vehicle body having a bottom edge the combination therewith of a safety bumper for said door bottom edge which comprises an elongated resilient member pivotally hinged to the outer surface of said bottom edge and normally projecting laterally and downwardly therefrom, the pivotal axis of said member extending generally parallel with said bottom edge whereby said member abuts the vehicle body adjacent said door when said door is closed and pivots downwardly to hang below said bottom edge when the door is opened.

2. The combination as defined by claim 1 in which elongated resilient member is in the form of a length of flexible tubing.

References Cited in the file of this patent

UNITED STATES PATENTS

| | | |
|---|---|---|
| 2,213,461 | Ellis | Sept. 3, 1940 |
| 2,348,319 | Bailey | May 9, 1944 |
| 2,633,380 | Shapiro | Mar. 31, 1953 |
| 2,853,339 | Lazarus | Sept. 23, 1958 |